US012435768B2

(12) United States Patent
Whatcott (10) Patent No.: US 12,435,768 B2
(45) Date of Patent: Oct. 7, 2025

(54) ELASTOMERIC CUSHION MEMBERS INCLUDING PERFORATED SKINS AND RELATED METHODS

(71) Applicant: Purple Innovation, LLC, Alpine, UT (US)

(72) Inventor: Russell B. Whatcott, Eagle Mountain, UT (US)

(73) Assignee: Purple Innovation, LLC, Lehi, UT (US)

( * ) Notice: Subject to any disclaimer, the term of this patent is extended or adjusted under 35 U.S.C. 154(b) by 0 days.

(21) Appl. No.: 15/062,847

(22) Filed: Mar. 7, 2016

(65) Prior Publication Data

US 2017/0254379 A1 Sep. 7, 2017

(51) Int. Cl.
*A47C 27/00* (2006.01)
*A47C 27/08* (2006.01)
*F16F 3/087* (2006.01)
*F16F 13/06* (2006.01)

(52) U.S. Cl.
CPC ............ *F16F 3/0873* (2013.01); *A47C 27/00* (2013.01); *A47C 27/085* (2013.01); *F16F 13/06* (2013.01); *F16F 2226/04* (2013.01)

(58) Field of Classification Search
CPC ...... F16F 3/0873; F16F 13/06; F16F 2226/04; A47C 27/00; A47C 27/085
See application file for complete search history.

(56) References Cited

U.S. PATENT DOCUMENTS

| 4,265,955 | A | * | 5/1981 | Harp | B29D 24/005 |
| | | | | | 428/116 |
| 4,422,183 | A | * | 12/1983 | Landi | A41D 13/015 |
| | | | | | 2/455 |
| 5,180,619 | A | | 1/1993 | Landi et al. | |
| 5,749,111 | A | | 5/1998 | Pearce | |
| 5,994,450 | A | | 11/1999 | Pearce | |
| 6,026,527 | A | | 2/2000 | Pearce | |
| 6,187,837 | B1 | | 2/2001 | Pearce | |
| 6,413,458 | B1 | | 7/2002 | Pearce | |
| 6,415,583 | B1 | * | 7/2002 | Landi | B68C 1/12 |
| | | | | | 54/44.7 |
| 6,498,198 | B2 | | 12/2002 | Pearce | |

(Continued)

OTHER PUBLICATIONS

International Search Report for PCT Application No. PCT/US2017/020741 dated May 29, 2017, 4 pages.

(Continued)

*Primary Examiner* — Thomas W Irvin
(74) *Attorney, Agent, or Firm* — Foley & Lardner LLP (57) ABSTRACT

Elastomeric cushion members may include a plurality of interconnected buckling walls including an elastomeric material. The interconnected buckling walls may together define a plurality of columns. A perforated skin may extend between at least some of the plurality of interconnected buckling walls of at least some of the plurality of columns. Methods of making elastomeric cushion members may involve interconnecting a plurality of buckling walls including an elastomeric material. The interconnected buckling walls may together define a plurality of columns. A perforated skin may be positioned to extend between at least some of the plurality of interconnected buckling walls of at least some of the plurality of columns.

17 Claims, 5 Drawing Sheets

(56) References Cited

U.S. PATENT DOCUMENTS

| | | |
|---|---|---|
| 6,797,765 B2 | 9/2004 | Pearce |
| 6,865,759 B2 | 3/2005 | Pearce |
| 6,908,662 B2 | 6/2005 | Pearce |
| 7,060,213 B2 | 6/2006 | Pearce |
| 7,076,822 B2 | 7/2006 | Pearce |
| 7,730,566 B2 | 6/2010 | Flick et al. |
| 7,823,233 B2 | 11/2010 | Flick et al. |
| 7,827,636 B2 | 11/2010 | Flick et al. |
| 7,964,664 B2 | 6/2011 | Pearce |
| 8,075,981 B2 | 12/2011 | Pearce et al. |
| 8,434,748 B1 | 5/2013 | Pearce et al. |
| 8,592,024 B2 | 11/2013 | Stadtlander et al. |
| 8,607,387 B2 | 12/2013 | Flick et al. |
| 8,628,067 B2 | 1/2014 | Pearce et al. |
| 8,919,750 B2 | 12/2014 | Pearce et al. |
| 8,932,692 B2 | 1/2015 | Pearce |
| 9,051,169 B2 | 6/2015 | Pearce et al. |
| 2012/0244312 A1 | 9/2012 | Pearce et al. |
| 2013/0167302 A1 | 7/2013 | Pearce |
| 2017/0251825 A1 | 9/2017 | Pearce |
| 2017/0254003 A1 | 9/2017 | Pearce |

OTHER PUBLICATIONS

Written Opinion of International Searching Authority for PCT Application No. PCT/US2017/020741 dated May 29, 2017, 9 pages.

\* cited by examiner

ELASTOMERIC CUSHION MEMBERS INCLUDING PERFORATED SKINS AND RELATED METHODS

FIELD

This disclosure relates generally to elastomeric cushion members configured to reduce peak pressure on a cushioned body, which may increase comfort for users, and may protect objects from damage. More specifically, disclosed embodiments relate to elastomeric cushion members that may increase airflow and breathability while reducing material quantities, reducing weight, and increasing lateral stability, strength, and resilience.

BACKGROUND

Cushioning materials have a variety of uses, such as for mattresses, seating surfaces, shoe inserts, packaging, medical devices, etc. Cushioning materials may be formulated and/or configured to reduce peak pressure on a cushioned body, which may increase comfort for users, and may protect objects from damage. Cushioning materials may include materials that deflect or deform under load, such as polyethylene or polyurethane foams (e.g., convoluted foam), vinyl, rubber, springs, natural or synthetic fibers, fluid-filled flexible containers, etc. Different cushioning materials may have different responses to a given pressure, and some materials may be well suited to different applications. Cushioning materials may be used in combination with one another to achieve selected properties.

For example, cushioning materials and configurations therefor are disclosed in U.S. Pat. No. 9,051,169, issued Jun. 9, 2015, to Pearce et al.; U.S. Pat. No. 8,919,750, issued Dec. 30, 2014, to Pearce et al.; U.S. Pat. No. 8,628,067, issued Jan. 14, 2014, to Pearce et al.; and U.S. Pat. No. 8,434,748, issued May 17, 2013, to Pearce et al., and U.S. Patent App. Pub. Nos. 2013/0167302, published Jul. 4, 2013, to Pearce; 2012/0244312, published Sep. 27, 2012, to Pearce et al., each assigned to the assignee of this application, the disclosure of each of which is incorporated herein in its entirety by this reference.

BRIEF SUMMARY

In some embodiments, elastomeric cushion members may include a plurality of interconnected buckling walls including an elastomeric material, the elastomeric material including an elastomeric polymer. The interconnected buckling walls may together define a plurality of columns. A perforated skin may extend between at least some of the plurality of interconnected buckling walls of at least some of the plurality of columns.

In other embodiments, methods of making elastomeric cushion members may involve interconnecting a plurality of buckling walls including an elastomeric material, the elastomeric material including an elastomeric polymer. The interconnected buckling walls may together define a plurality of columns. A perforated skin may be positioned to extend between at least some of the plurality of interconnected buckling walls of at least some of the plurality of columns.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

The illustrations presented in this disclosure are not meant to be actual views of any particular cushion member or component thereof, but are merely idealized representations employed to describe illustrative embodiments. Thus, the drawings are not necessarily to scale.

Disclosed embodiments relate generally to elastomeric cushion members that may increase airflow and breathability while reducing material quantities, reducing weight, and increasing lateral stability, strength, and resilience. More specifically, disclosed are embodiments of elastomeric cushion members that may include a perforated skin over interconnected buckling walls of columns of the elastomeric cushion members to establish airflow between the opposing sides of the elastomeric cushion member and increase lateral stability, strength, and resilience.

As used in this disclosure, the term "gel" means and includes solid elastomers (i.e., materials capable of recovering size and shape after deformation) extended by at least 20 parts plasticizer per 100 parts solid elastomer by weight (20:100). For example, gels include styrene-ethylene-ethylene-propylene-styrene (SEEPS), styrene-ethylene-butylene-styrene (SEBS), styrene-ethylene-propylene-styrene (SEPS), and other elastomers. In some embodiments, the solid elastomer may be extended to at least 50:100 and, such as, for example, by at least 100:100. Additional illustrative gels suitable for use in the cushion members of this disclosure are disclosed in U.S. Pat. Nos. 7,060,213; 7,076,822; 6,908,662; 6,865,759; 6,797,765; 6,498,198; 6,413,458; 6,187,837; 6,026,527; 5,994,450, the disclosure of each of which is incorporated herein in its entirety by this reference.

Figure 1:
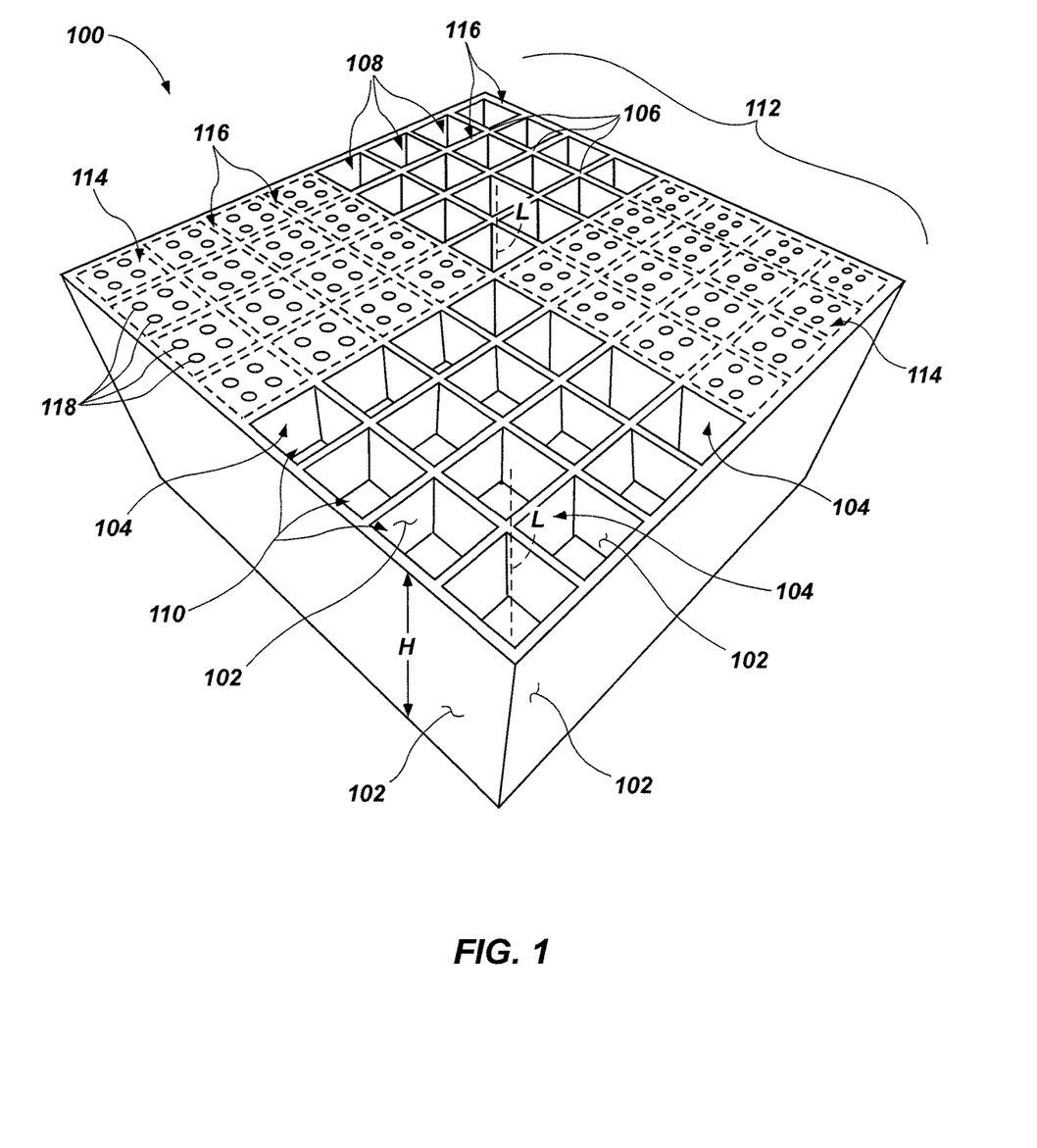
FIG. 1 is a perspective view of an elastomeric cushion member.

Referring to FIG. 1, a perspective view of an elastomeric cushion member 100 is shown. The elastomeric cushion member 100 may be configured to reduce peak pressure on a cushioned body. More specifically, the elastomeric cushion member 100 may be configured for use as a seat cushion (e.g., a car seat cushion, wheelchair cushion, work chair cushion), mattress, mattress pad, or lumbar support.

The elastomeric cushion member 100 may include a plurality of interconnected buckling walls 102 comprising an elastomeric material. The interconnected buckling walls 102 may include, for example, inner surfaces 104 extending laterally between interconnection regions 106 at vertices between the interconnected buckling walls 102. Subsets of the inner surfaces 104 may laterally enclose spaces 108 within the inner surfaces 104 of the interconnected buckling walls 102. The walls 102 collectively laterally enclosing a respective space 108 may define a column 110 laterally surrounding the space 108 and extending longitudinally to a height H. The height H of the columns 110 may correspond to a height H of the elastomeric cushion member 100.

The plurality of columns 110 may be arranged in an array 112 of repeating geometric, cross-sectional shapes. For example, a cross-sectional shape of the columns 110 may be circular, triangular, rectangular, pentagonal, hexagonal, etc., or some combination of such geometric shapes, the cross-section taken in a plane at least substantially perpendicular to longitudinal axes L of the columns 110. The columns 110 may be located laterally adjacent to one another and may be interconnected to form the array 112. For example, adjacent columns 110 may share one or more interconnected buckling walls 102 and may share one or more interconnection regions 106. As a specific, nonlimiting example, the plurality of columns 110 may be arranged in a grid of at least substantially square cross-sectional shapes.

The elastomeric material of the interconnected buckling walls 102 may include, for example, an elastomeric polymer. More specifically, the elastomeric material of the interconnected buckling walls 102 may be, for example, a gel.

The plurality of columns 110 may be configured to support loads to cushion a user or object. For example, at least some of the plurality of columns 110 may buckle elastically in response to an applied load. Such columns 110 may be sized, shaped, and configured to buckle at a predetermined pressure threshold, such that buckling may relieve pressure hot spots and redistribute pressure so that no part of the cushioned object receives pressure above the predetermined threshold. In addition, the ability of individual columns 110 to deform laterally to the direction of the principal cushioning load may relieve shear stresses. Further, the elastomeric material of the columns 110, and especially plasticized elastomers, such as gel, may absorb shock and attenuate vibration. Accordingly, the columns 110 may be configured to cushion objects, absorb shock, and attenuate vibration. A primary intended direction of the applied load may be, for example, at least substantially parallel to a longitudinal axis L extending through the space 108 of a column 110 in a direction at least substantially parallel to undeformed inner surfaces 104 of the interconnected buckling walls 102 of the column 110.

A perforated skin 114 may be secured to ends 116 of at least some of the plurality of interconnected buckling walls 102. The perforated skin 114 may enable the elastomeric cushion member 100 to better support loads applied in directions other than the primary indented direction, such as, for example, lateral loads. In addition, the perforated skin 114 may enable the elastomeric cushion member 100 to better return at least substantially to its undeformed shape after supporting, and deforming in response to, an applied load. Still further, the perforated skin 114 may enable the elastomeric cushion member 100 to better provide airflow from one side of the elastomeric cushion member 100 to an opposite side of the elastomeric cushion member 100. The perforated skin 114 may be located, for example, on a side of the ends 116 of the respective columns 110 facing a user when the elastomeric cushion member 110 is oriented for use.

The perforated skin 114 may partially cover the ends 116 of some of the plurality of columns 110. For example, the perforated skin 114 may include a sheet (e.g., a membrane) of material extending between adjacent interconnected buckling walls 102 and partially cover the spaces 108 within at least some of the columns 110 at the ends 116 of the respective columns 110. At least some of the plurality of columns 110 may be free of the perforated skin 114. For example, the perforated skin 114 may partially cover the spaces 108 of some of the columns 110 at one or more ends 116, while others of the spaces 108 may remain exposed to the exterior of the elastomeric cushion member 100 at both ends 116.

The perforated skin 114 may include airflow passages 118 extending through the perforated skin 114. For example, the airflow passages 118 may extend through the perforated skin 114 in a direction at least substantially parallel to the longitudinal axes L of the undeformed columns 110. The airflow passages 118 may establish fluid communication between the spaces 108 of the columns 110 and the exterior of the elastomeric cushion member 100. For example, the airflow passages 118 may be aligned with the spaces 108, and may be misaligned from the interconnected buckling walls 102. The airflow passages 118 may permit air to flow from one side of the elastomeric cushion member 100 to another, opposite side of the elastomeric cushion member 100, increasing breathability of the elastomeric cushion member 100, including in regions where the perforated skin 114 is located. The airflow passages 118 may include, for example, holes, ports, or openings in the perforated skin 114 extending entirely therethrough.

The airflow passages 118 may be arranged in another array of repeating geometric, cross-sectional shapes. For example, the cross-sectional shapes of the airflow passages 118 may be circular, triangular, rectangular, pentagonal, hexagonal, etc., or some combination of such geometric shapes, the cross-section taken in a plane at least substantially perpendicular to longitudinal axes L of the columns 110. At least one airflow passage 118 may extend through the perforated skin 114 at each space 108 partially covered by the perforated skin 114. For example, the perforated skin 114 may include a pattern of airflow passages 118 for each space 108, which pattern may be, for example, repeated for each space 108 partially covered by the perforated skin 114. More specifically, the airflow passages 118 may be arranged to at least substantially mimic a shape of a lateral periphery of the associated column 110 in a location offset from the periphery and over the space 108. As a specific, nonlimiting example, the perforated skin 114 may include an airflow passage 118 for each interconnection region 106 of the associated column 110 (e.g., three when the column 110 is triangular, four when the column 110 is rectangular, etc.), the airflow passage 118 being offset from the interconnection region 106 toward the longitudinal axis L by a predetermined distance.

A surface area of the perforated skin 114 may cover less than a total area of the space 108 as measured in a plane at least substantially perpendicular to the longitudinal axis L. For example, the surface area of the perforated skin 114 may be between about 20% and about 80% of the area of each corresponding space 108 partially covered by an associated portion of the perforated skin 114 as measured in a direction at least substantially perpendicular to the longitudinal axis L of each column 110 of the plurality of columns 110. More specifically, the surface area of the perforated skin 114 may be, for example, between about 30% and about 70% of the area of each corresponding space 108 partially covered by an associated portion of the perforated skin 114. As a specific, nonlimiting example, the surface area of the perforated skin 114 may be, for example, between about 40% and about 60% (e.g., about 50%) of the area of each corresponding space 108 partially covered by an associated portion of the perforated skin 114.

The quantity of columns 110 having the perforated skin 114 covering the respective ends 116 thereof may be, for example, between about 25% and about 75% of the total number of columns 110 of the elastomeric cushion member 100. More specifically, the quantity of columns 110 having the perforated skin 114 covering the respective ends 116 thereof may be, for example, between about 40% and about 60% of the total number of columns 110 of the elastomeric cushion member 100. As a specific, nonlimiting example, the quantity of columns 110 having the perforated skin 114 covering the respective ends 116 thereof may be, for example, about 50% of the total number of columns 110 of the elastomeric cushion member 100.

In some embodiments, such as that shown in FIG. 1, the perforated skin 114 may be arranged in yet another array of repeating geometric, cross-sectional shapes. For example, the perforated skin 114 may be positioned in a repeating pattern of geometric shapes, borders of which may follow peripheries of groups of columns 110 along the interconnected buckling walls 102 thereof. More specifically, each subsection of the perforated skin 114 covering a group of columns 110 may exhibit the same overall cross-sectional shape as at least one of the underlying columns 110. As a specific, nonlimiting example, the perforated skin 114 may be arranged in an at least substantially checkerboard-pattern grid covering some at least substantially rectangular columns 110 (e.g., square sheets, each covering a two-by-two, three-by-three, four-by-four, etc. grouping of square columns 110, with two-by-two, three-by-three, four-by-four, etc. groupings of square columns lacking perforated skin 114 interposed between adjacent sections of the perforated skin 114) of the grid, other at least substantially rectangular columns 110 of the grid being free of the perforated skin 114. A total cross-sectional area of the array 112 of columns 110 may be greater than another total cross-sectional area of the other array of perforated skin 114.

The perforated skin 114 may include an elastomeric material. For example, the elastomeric material of the perforated skin 114 may include an elastomeric polymer. More specifically, the elastomeric material of the perforated skin 114 may be, for example, a gel. In some embodiments the material of the perforated skin 114 may be the same as the material of the interconnected buckling walls 102. In other embodiments, the material of the perforated skin 114 may be different from the material of the interconnected buckling walls 102.

Figure 2:
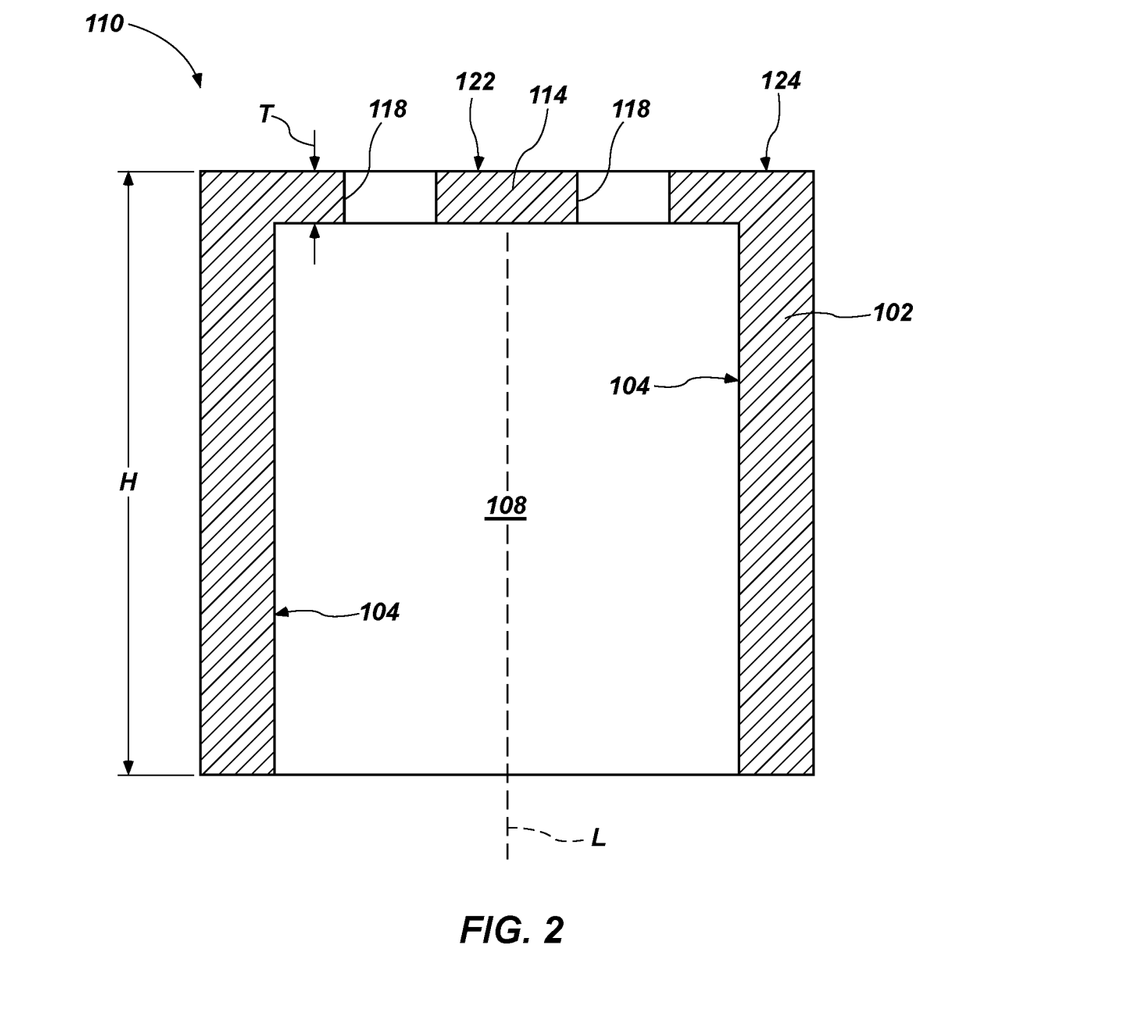
FIG. 2 is a cross-sectional side view of a column of the elastomeric cushion member of FIG. 1.

FIG. 2 is a cross-sectional side view of a column 110 of the elastomeric cushion member 100 of FIG. 1. A greatest thickness T of the perforated skin 114 may be less than height H of the plurality of columns 110 as measured in a direction parallel to a longitudinal axis L of each column 110 of the plurality of columns 110 in the elastomeric cushion member 100. For example, the greatest thickness T of the perforated skin 114 may be about 25% or less of a height H of the columns 110. More specifically, the greatest thickness T of the perforated skin 114 may be, for example, about 10% or less of a height H of the columns 110. As a specific, nonlimiting example, the greatest thickness T of the perforated skin 114 may be about 5% or less of a height H of the columns 110.

In some embodiments, such as that shown in FIGS. 1 and 2, the perforated skin 114 may be formed integrally with the columns 110. For example, a precursor material of the interconnected buckling walls 102 and perforated skin 114 may be positioned in a mold comprising an inverse shape to the intended final shape of the elastomeric cushion member 100, and the precursor material may be cured (e.g., cross-linked) to form the interconnected buckling walls 102 and perforated skin 114. A resulting upper surface 122 of the perforated skin 114 may be at least substantially coplanar with upper surfaces 124 of the interconnected buckling walls 102.

Figure 3:
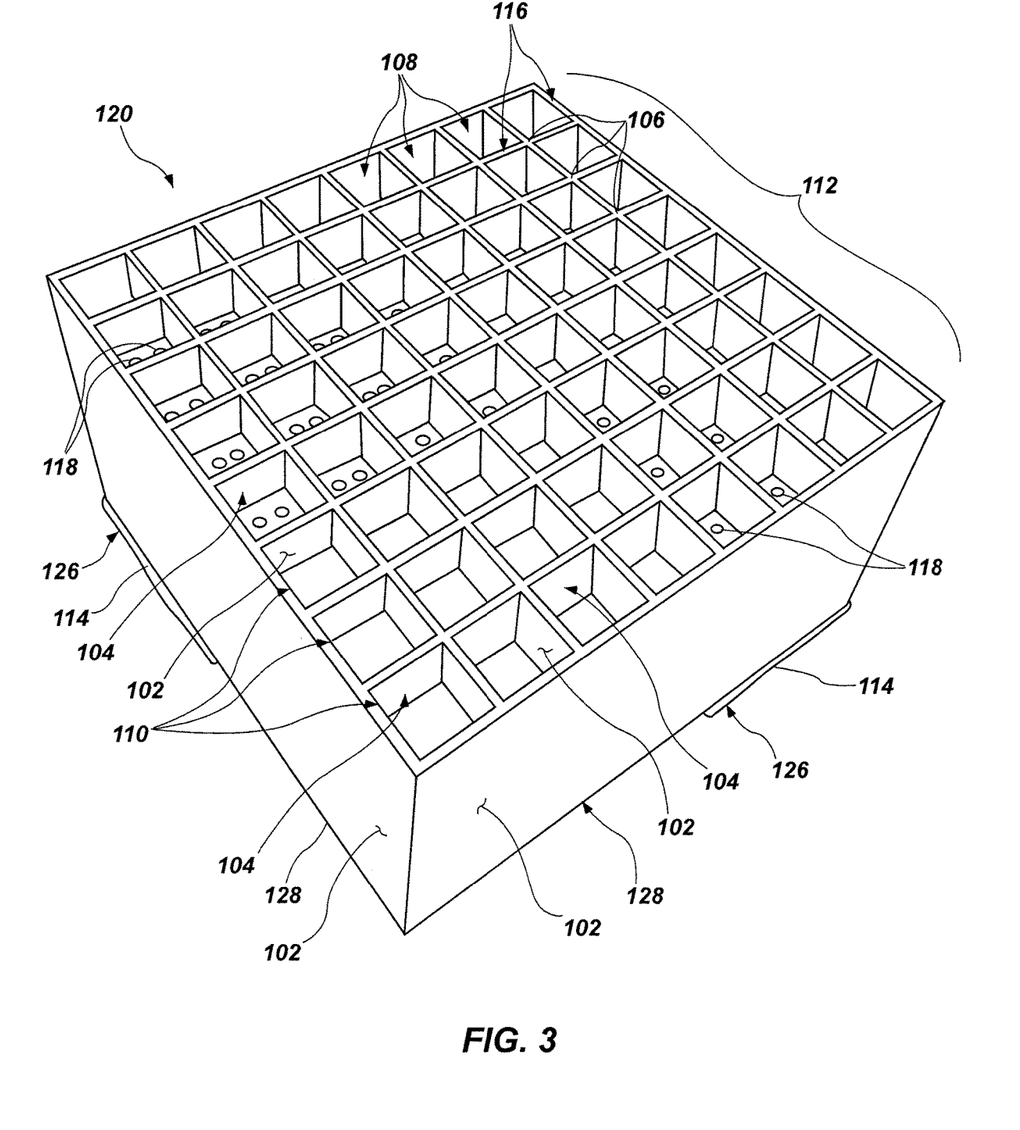
FIG. 3 is a perspective top/side view of another embodiment of an elastomeric cushion member.
Figure 4:
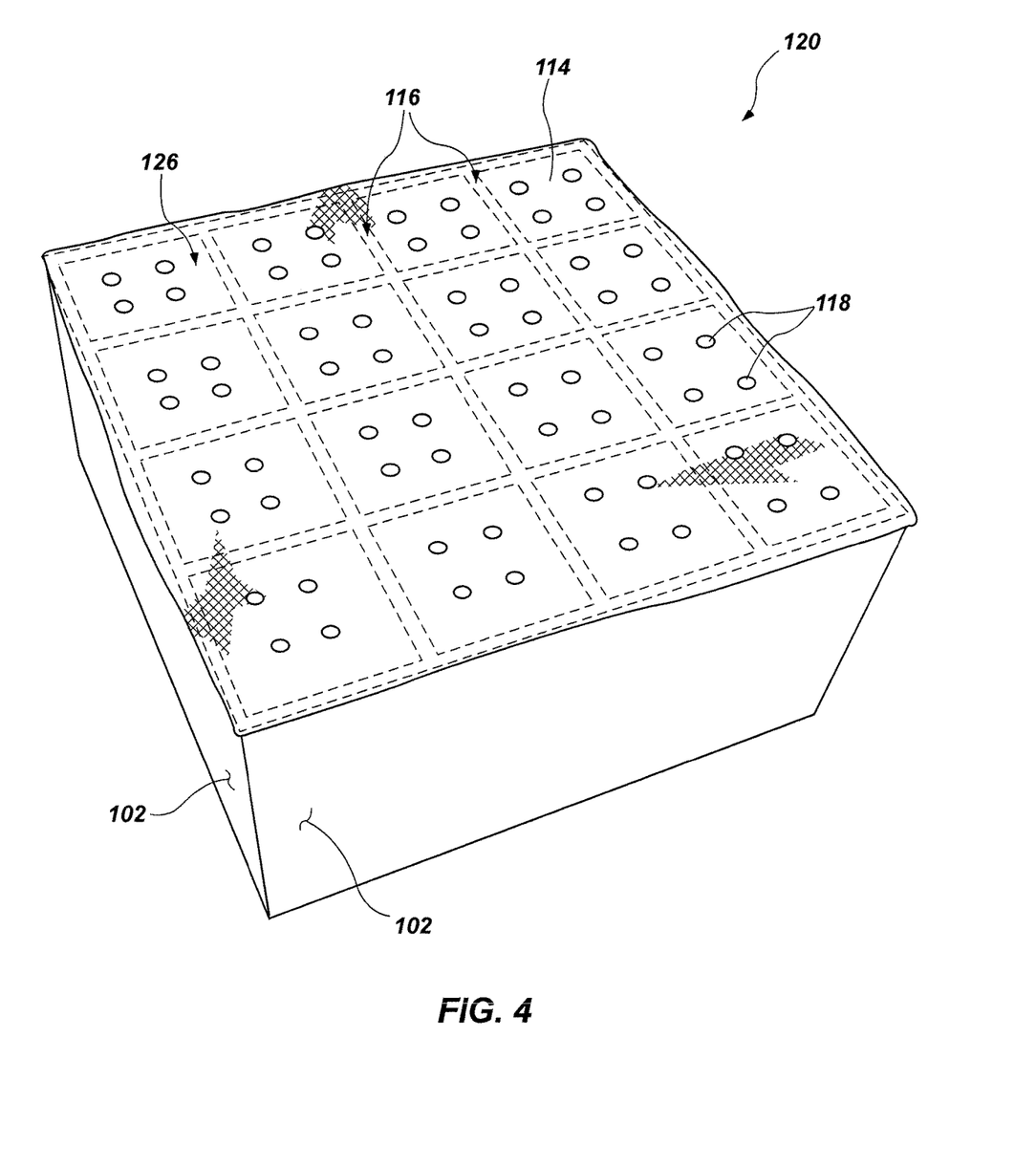
FIG. 4 is a perspective bottom/side view of a portion of the elastomeric cushion member of FIG. 3.

FIG. 3 is a perspective top/side view of another embodiment of an elastomeric cushion member 120, and FIG. 4 is a perspective bottom/side view of a portion of the elastomeric cushion member 120 of FIG. 3. Referring collectively to FIGS. 3 and 4, the perforated skin 114 may be located on a side of the ends 116 of the some of the plurality of columns 110 opposite a user when the elastomeric cushion member 120 is oriented for use. In still other embodiments, the perforated skin 114 may be located on both sides of the ends 116 of some of the columns 110, both facing toward and away from the user.

In some embodiments, such as that shown in FIGS. 3 and 4, the perforated skin 114 may be fouled separately from, and be subsequently secured to, the columns 110. The resulting lower surfaces 126 of the perforated skin 114 lie in a different plane from lower surfaces 128 of the interconnected buckling walls 102.

Figure 5:
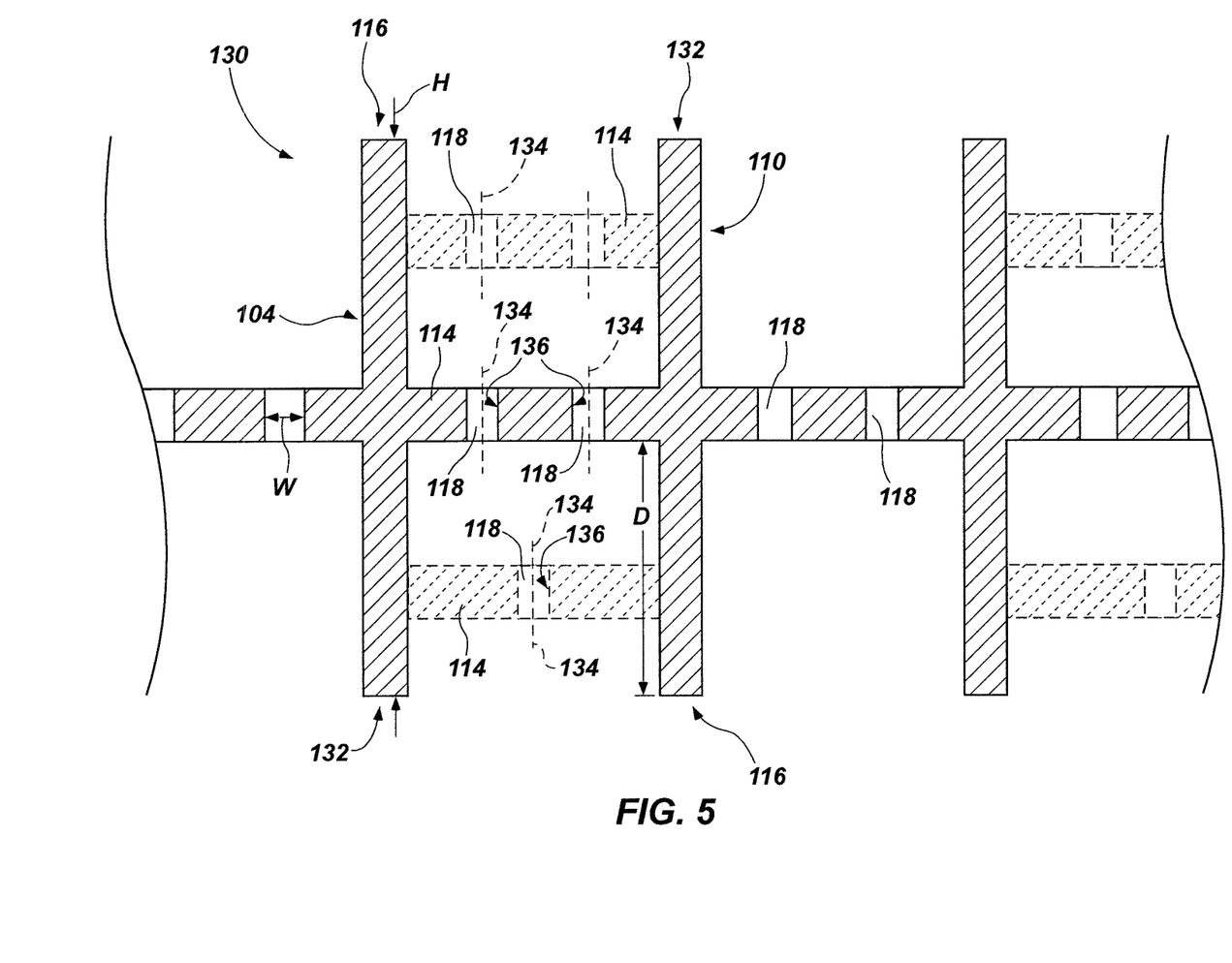
FIG. 5 is a cross-sectional side view of a portion of yet another embodiment of an elastomeric cushion member.

FIG. 5 is a cross-sectional side view of a portion of yet another embodiment of an elastomeric cushion member 130. In some embodiments, such as that shown in FIG. 5, the perforated skin 114 may be located between the ends 116 of some of the plurality of columns 110. For example, the perforated skin 114 may be located a distance D at least about 5% of the height H of the columns 110 away from the closest end surface 132 at the end 116 of the associated column 110. More specifically, the distance D to the perforated skin 114 may be, for example, at least about 10% of the height H of the columns 110 away from the closest end surface 132 at the end 116 of the associated column 110. As specific, nonlimiting examples, the distance D to the perforated skin 114 may be at least about 25% or at least about 35% (e.g., about 50%) of the height H of the columns 110 away from the closest end surface 132 at the end 116 of the associated column 110.

In some embodiments, the elastomeric cushion member 130 may include multiple, discrete perforated skins 114, as shown in dashed lines in FIG. 5, located between the ends 116 of an associated column 110. In some such embodiments, the airflow passages 118 of adjacent perforated skins 114 may be at least substantially aligned with one another. For example, longitudinal axes 134 at geometric centers of the airflow passages 118 may be at least collinear with one another. More specifically, side surfaces 136 of the perforated skins 114 defining the airflow passages 118 may be at least substantially coplanar with one another. In other such embodiments, the airflow passages 118 of adjacent perforated skins 114 may be offset from one another. For example, the longitudinal axes 134 at the geometric centers of the airflow passages 118 may be laterally offset from one another by at least about 25% of a width W of the airflow passages 118. More specifically, the longitudinal axes 134 at the geometric centers of the airflow passages 118 may be laterally offset from one another by at least about 50% of a width W of the airflow passages 118. As a specific, nonlimiting example, the lateral footprints of the airflow passages 118 may not longitudinally overlap one another.

In some embodiments, and referring collectively to FIGS. 1 through 4, elastomeric cushion members 100, 120 within the scope of this disclosure may further include a cushioning fabric, such as, for example, a knitted fabric, at least partially covering the elastomeric cushion member 100. Suitable cushioning fabrics are disclosed in U.S. patent application Ser. No. 15/062,621, now U.S. Patent Publication No. 2017/0251825, filed on the same date as this application, titled "MATTRESSES AND MATTRESS TOPPERS INCLUDING KNITTED FABRIC, AND RELATED METHODS," to Pearce, the disclosure of which is incorporated herein in its entirety by this reference.

In some embodiments, elastomeric cushion members 100, 120 within the scope of this disclosure may include graphic elements on side surfaces thereof, the graphic elements being visible in high relief through a cushion cover. Suitable graphic elements and cushion covers are disclosed in U.S. patent application Ser. No. 15/063,143, now U.S. Patent Publication No. 2017/0254003, filed on the same date as this application, titled "CUSHION COVER WITH INTEGRALLY KNIT, HIGH-RELIEF GRAPHIC FEATURE AND CUSHIONS EMPLOYING SUCH CUSHION COVERS," to Pearce, the disclosure of which is incorporated herein in its entirety by this reference.

In some embodiments, elastomeric cushion members 100, 120 within the scope of this disclosure may be packaged for shipping in a compact and easy-to-unpack manner. Suitable methods for packaging an elastomeric cushion member 100, 120 for shipping are disclosed in U.S. patent application Ser. No. 15/063,114, filed on the same date as this application, titled "A BAG FOR SHIPPING A CUSHION AND RELATED METHODS," now U.S. Pat. No. 9,796,522 to Pearce, the disclosure of which is incorporated herein in its entirety by this reference.

Additional, nonlimiting embodiments within the scope of this disclosure include the following:

Embodiment 1

An elastomeric cushion member, comprising: a plurality of interconnected buckling walls comprising an elastomeric material, the elastomeric material comprising an elastomeric polymer, the interconnected buckling walls together defining a plurality of columns; and a perforated skin extending between at least some of the plurality of interconnected buckling walls of at least some of the plurality of columns.

Embodiment 2

The elastomeric cushion member of Embodiment 1, wherein the perforated skin is located at a longitudinal end of the at least some of the plurality of columns.

Embodiment 3

The elastomeric cushion member of Embodiment 1, wherein the perforated skin is located between longitudinal ends of the at least some of the plurality of columns.

Embodiment 4

The elastomeric cushion member of any one of Embodiments 1 through 3, wherein at least some others of the plurality of columns are free of the perforated skin.

Embodiment 5

The elastomeric cushion member of Embodiment 4, wherein the at least some others of the plurality of columns free of the perforated skin comprise between about 25% and about 75% of the plurality of columns.

Embodiment 6

The elastomeric cushion member of any one of Embodiments 1 through 5, wherein the elastomeric polymer of the plurality of interconnected buckling walls is a gel.

Embodiment 7

The elastomeric cushion member of any one of Embodiments 1 through 6, wherein the perforated skin comprises an elastomeric material, the elastomeric material of the perforated skin comprising an elastomeric polymer.

Embodiment 8

The elastomeric cushion member of Embodiment 7, wherein the elastomeric polymer of the perforated skin is a gel.

Embodiment 9

The elastomeric cushion member of any one of Embodiments 1 through 8, wherein the plurality of columns is arranged in an array of repeating geometric, cross-sectional shapes.

Embodiment 10

The elastomeric cushion member of Embodiment 9, wherein the perforated skin is arranged in another array of repeating geometric, cross-sectional shapes, a total cross-sectional area of the array of columns being greater than another total cross-sectional area of the other array of perforated skin.

Embodiment 11

The elastomeric cushion member of Embodiment 10, wherein the plurality of columns is arranged in a grid of at least substantially rectangular cross-sectional shapes and the perforated skin is arranged in an at least substantially checkerboard-pattern grid covering some at least substantially rectangles of the grid of at least substantially rectangular cross-sectional shapes, other at least substantially rectangles of the grid of at least substantially rectangular cross-sectional shapes being free of the perforated skin.

Embodiment 12

The elastomeric cushion member of any one of Embodiments 1 through 11, wherein the perforated skin comprises airflow passages extending through the perforated skin, the airflow passages arranged in an array of repeating geometric, cross-sectional shapes.

Embodiment 13

The elastomeric cushion member of Embodiment 12, wherein the airflow passages extending through the perforated skin are aligned with spaces extending longitudinally through the columns of the plurality of columns and misaligned with the walls of the plurality of interconnected buckling walls.

Embodiment 14

The elastomeric cushion member of Embodiment 13, wherein the surface area of the perforated skin covers between about 20% and about 80% of an area of each corresponding space partially covered by an associated portion of the perforated skin as measured in a direction perpendicular to a longitudinal axis of each column of the plurality of columns.

Embodiment 15

A method of making an elastomeric cushion member, comprising: interconnecting a plurality of buckling walls comprising an elastomeric material, the elastomeric material comprising an elastomeric polymer, the interconnected buckling walls together defining a plurality of columns; and positioning a perforated skin to extend between at least some of the plurality of interconnected buckling walls of at least some of the plurality of columns.

Embodiment 16

The method of Embodiment 15, further comprising positioning the perforated skin at a longitudinal end of the at least some of the plurality of columns.

Embodiment 17

The method of Embodiment 15, further comprising positioning the perforated skin between longitudinal ends of the at least some of the plurality of columns.

Embodiment 18

The method of any one of Embodiments 15 through 17, further comprising leaving at least some others of the plurality of columns free of the perforated skin.

Embodiment 19

The method of Embodiment 18, wherein leaving at least some others of the plurality of columns free of the perforated skin comprises leaving at least 50% of the plurality of columns free of the perforated skin.

Embodiment 20

The method of any one of Embodiments 15 through 19, wherein positioning the perforated skin to extend between the at least some of the plurality of interconnected buckling walls comprises positioning the perforated skin comprising airflow passages arranged in an array of repeating geometric, cross-sectional shapes extending through the perforated skin to extend between the at least some of the plurality of interconnected buckling walls, the airflow passages extending through the perforated skin being aligned with spaces extending longitudinally through the columns of the plurality of columns and misaligned with the walls of the plurality of interconnected buckling walls, the surface area of the perforated skin covering between about 20% and about 80% of an area of each corresponding space partially covered by an associated portion of the perforated skin as measured in a direction perpendicular to a longitudinal axis of each column of the plurality of columns.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventor.

What is claimed is:

1. An elastomeric cushion member, comprising:
a plurality of interconnected buckling walls comprising an elastomeric material, the elastomeric material comprising an elastomeric polymer and being resiliently compressible, the interconnected buckling walls together defining a plurality of columns of substantially equal length laterally enclosing spaces extending substantially through a thickness of the elastomeric cushion member, each column of the plurality of columns extending from a first open end to a second open end; and
a first membrane and a second membrane, each of the first and second membranes comprising the elastomeric material formed integrally with the plurality of interconnected buckling walls and extending across the spaces defined by at least some columns of the plurality of columns, transversely to lengths of the at least some columns, and only partially covering a space defined by at least one column of the at least some columns, without extending across other columns of the plurality of columns, wherein one of the first or second membranes defines at least two airflow passages in at least one space of the spaces to establish fluid communication between the at least one space of the spaces and an exterior of the elastomeric cushion member and the other of the one of the first or second membranes comprises an airflow passage laterally offset from the at least two airflow passages, and
wherein at least one of the first or second membranes is located at intermediate locations along the lengths of the at least some columns of the plurality of columns between the first open ends and the second open ends of the at least some columns of the plurality of columns.

2. The elastomeric cushion member of claim 1, wherein the other of the first or second membranes is located at a longitudinal end of the at least some columns of the plurality of columns.

3. The elastomeric cushion member of claim 1, wherein the one of the first or second membranes covers about 20% to about 80% of the space defined by the at least one column.

4. The elastomeric cushion member of claim 1, wherein the elastomeric polymer of the plurality of interconnected buckling walls comprises a gel.

5. The elastomeric cushion member of claim 1, wherein the first and second membranes comprise an elastomeric polymer.

6. The elastomeric cushion member of claim 5, wherein the elastomeric polymer of the first and second membranes comprises a gel.

7. The elastomeric cushion member of claim 1, wherein the plurality of columns is arranged in an array, with each column of the plurality of columns having the same geometric shape as every other column of the plurality of columns.

8. The elastomeric cushion member of claim 7, wherein each of the first and second membranes are arranged in another array, with each portion of the first and second membranes having the same geometric shape as every other portion of the first and second membranes.

9. The elastomeric cushion member of claim 8, wherein the plurality of columns is arranged in a grid of at least substantially rectangular cross-sectional shapes and the first and second membranes are arranged in a checkerboard pattern grid alternating columns of the plurality of columns.

10. The elastomeric cushion member of claim 1, wherein a portion of the first and second membranes not covering the space defined by at least one column comprises at least one of the at least two airflow passages in the one of the first or second membranes or the airflow passage in the other of the first or second membranes.

11. The elastomeric cushion member of claim 1, wherein each portion of the first and second membranes extends across about 30% and about 70% of the space defined by the at least one column.

12. The elastomeric cushion member of claim 1, wherein at least one of the first or second membranes covers a peripheral portion but not a center of the space defined by the at least one column.

13. A method of making an elastomeric cushion member comprising:
    forming a plurality of interconnected buckling walls comprising an elastomeric material, the elastomeric material comprising an elastomeric polymer, the interconnected buckling walls together laterally enclosing spaces defining a plurality of columns of substantially equal length, each column of the plurality of columns extending from a first open end to a second open end; and
    while forming the plurality of interconnected buckling walls, forming a first membrane and a second membrane, each of the first and second membranes extending across at least portions of spaces defined by some columns of the plurality of columns without extending across other columns of the plurality of columns, transversely to lengths of the at least some columns, and only partially covering a space defined by at least one column of the at least some columns, wherein one of the first or second membranes defines at least two airflow passages in at least one space of the spaces to establish fluid communication between the at least one space of the spaces and an exterior of the elastomeric cushion member and the other of the first or second membranes comprises an airflow passage laterally offset from the at least two airflow passages, and
    wherein at least one of the first or second membranes is located at intermediate locations along the lengths of the at least some columns between the first open ends and the second open ends of the at least some columns of the plurality of columns.

14. The method of claim 13, wherein forming the first and second membranes comprises forming the other of the at least one of the first or second membranes at longitudinal ends of the at least some columns of the plurality of columns.

15. The method of claim 13, wherein forming the first and second membranes comprises forming the first and second membranes to extend across fewer than 50% of the plurality of columns.

16. The method of claim 13, wherein forming the first and second membranes comprises forming the first and second membranes to cover about 20% to about 80% of the space defined by the at least one column.

17. An elastomeric cushion member, comprising:
    a plurality of interconnected buckling walls comprising an elastomeric material, the elastomeric material comprising an elastomeric polymer and being resiliently compressible, the interconnected buckling walls together defining an array of columns of substantially equal length comprising a grid of at least substantially rectangular cross-sectional shapes laterally enclosing spaces extending substantially through a thickness of the elastomeric cushion member, each column of the array of columns having the same geometric shape as every other column of the array of columns and extending from a first open end to a second open end; and
    a first membrane and a second membrane, each of the first and second membranes comprising the elastomeric material and formed integrally with the plurality of interconnected buckling walls and extending across the spaces defined by at least some columns of the plurality of columns, transversely to lengths of the at least some columns, and only partially covering a space defined by at least one column of the at least some columns, the first and second membranes being arranged in another array comprising a checkerboard pattern grid extending across alternating columns of the array of columns such that at least some of the spaces are free from the first and second membranes, with each portion of the first and second membranes having the same geometric shape as every other portion of the first and second membranes, a total cross-sectional area of the array of the array of columns being greater than another total cross-sectional area of the another array of the one of the first or second membranes, and wherein one of the first or second membranes defines at least two airflow passages in at least one space of the spaces to establish fluid communication between the at least one space of the spaces and an exterior of the elastomeric cushion member, and the other of the one of the first or second membranes comprises an airflow passage laterally offset from the at least two airflow passages, and
    wherein at least one of the first or second membranes is located at intermediate locations along the lengths of the at least some columns of the plurality of columns between the first open ends and the second open ends of the at least some columns of the plurality of columns.

* * * * *